United States Patent
Fujita et al.

(10) Patent No.: US 6,751,166 B2
(45) Date of Patent: Jun. 15, 2004

(54) PHASE ERROR DETECTION METHOD FOR MAGNETIC WALL DISPLACEMENT TYPE OF MAGNETO-OPTICAL RECORDING DEVICE

(75) Inventors: Goro Fujita, Kanagawa (JP); Tetsuhiro Sakamoto, Tokyo (JP); Minoru Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 10/005,607

(22) Filed: Dec. 7, 2001

(65) Prior Publication Data

US 2002/0114226 A1 Aug. 22, 2002

(30) Foreign Application Priority Data

Dec. 8, 2000 (JP) ........................................ 2000-375035

(51) Int. Cl.[7] ............................................... G11B 11/00
(52) U.S. Cl. .................................... 369/13.26; 369/116
(58) Field of Search ........................... 369/13.26, 13.08, 369/13.05, 13.06, 13.07, 13.09, 116, 13.27; 428/694 ML (56) References Cited

U.S. PATENT DOCUMENTS

| | | | | |
|---|---|---|---|---|
| 5,587,975 A | * | 12/1996 | Kobayashi | 369/13.02 |
| 6,041,024 A | * | 3/2000 | Ishii | 369/13.47 |
| 6,058,077 A | * | 5/2000 | Miyaoka | 369/13.24 |
| 6,084,830 A | * | 7/2000 | Ashinuma et al. | 369/13.47 |
| 6,246,641 B1 | * | 6/2001 | Miyaoka | 369/13.05 |
| 6,421,304 B1 | * | 7/2002 | Yoshimura et al. | 369/13.06 |
| 6,519,212 B2 | * | 2/2003 | Ashinuma | 369/13.26 |

FOREIGN PATENT DOCUMENTS

| | | | | |
|---|---|---|---|---|
| JP | 11-296928 A | * | 10/1999 | 369/13.16 |
| JP | 11-296929 A | * | 10/1999 | 369/13.17 |

* cited by examiner

*Primary Examiner*—Tan Dinh
(74) *Attorney, Agent, or Firm*—Oblon, Spivak, McClelland, Maier & Neustadt, P.C.

(57) ABSTRACT

A phase error detection apparatus and method is disclosed whereby a data signal is played back at a high S/N ratio from a magneto-optical disk making use of a ghost signal by magnetic domain wall displacement detection while the playback laser poser is kept at an optimum level. First, the laser power is controlled so that the time delay of a ghost signal from a data signal may be equal to a fixed multiple of a data detection clock. Thereupon, a laser power control section searches for a point at which the amount of jitters generated is small based on a RF signal. Then, the playback laser power is adjusted so that the time delay amount of the ghost signal from the data signal may be the fixed multiple n=5 of the clock nearest to the phase delay amount set in advance of a ghost which appears in the isothermal region with a laser power with which an optimum signal characteristic is obtained. In this instance, the laser power control section searches for a peak of the 5T amplitude of the displacement phase difference controlling pattern.

16 Claims, 11 Drawing Sheets

FIG. 5B Pr(high)

FIG. 5C Pr(mid)

FIG. 5D Pr(low)

FIG. 5E Pr(verylow)

FIG. 9A Sum SIGNAL
FIG. 9B Sum SIGNAL (AFTER LPF)
FIG. 9C Enable
FIG. 9D Def SIGNAL
FIG. 9E Def SIGNAL (AFTER LPF)
FIG. 9F Def(I+1)−Def(I−1)
FIG. 9G PHASE ERROR Def(I+1)−Def(I−1)&Enable↑
FIG. 9H

PHASE ERROR DETECTION METHOD FOR MAGNETIC WALL DISPLACEMENT TYPE OF MAGNETO-OPTICAL RECORDING DEVICE

BACKGROUND OF THE INVENTION

This invention relates to a phase error detection apparatus and method for detecting an error which occurs with a phase difference between a magnetic domain wall displacement which occurs at a leading end of an isothermal region formed on a recording medium and another magnetic domain wall displacement which occurs at a trailing end of the isothermal region, and a laser power control apparatus and method for controlling the laser power using the phase error detection apparatus and method, as well as a magneto-optical recording and/or playback apparatus for playing back an information signal from a magneto-optical recording medium using the laser power control apparatus and method.

Conventionally, various optical disks have been proposed as a recording medium for an information signal, and as an optical disk which allows rewriting of an information signal, a magneto-optical (MO) disk and a phase change (PC) disk have been proposed. Investigations have been and are being performed to allow higher density recording of such magneto-optical disk and phase change disk. However, it is considered to be difficult to read a mark smaller than a reading light spot.

However, for the magneto-optical disk, a super-resolution technique for masking marks which are not an object of playback to eliminate intersymbol interference while playing back only marks of an object of playback has been developed.

Further, a magnetic domain expansion and playback system (MAMMOS: Magnetic AMplifying Magneto-Optical System) and a magnetic domain wall displacement detection system (DWDD) have been proposed recently for playback of a magneto-optical disk recorded in a high density.

Both of the magnetic domain expansion and playback and the magnetic domain wall displacement detection expand the magnetic domain of a mark smaller than a light spot for playback through a distribution of heat generated by the light spot to read the mark. When the magnetic domain expansion and playback and the magnetic domain wall displacement detection are compared with each other, the latter can detect an edge of a mark clearly while the former can detect the position of a mark with certainty. Accordingly, the magnetic domain wall displacement detection is suitable to play back an optical disk which adopts "mark edge recording".

The principle of playback by the magnetic domain wall displacement detection is described using an isolated mark. In particular, according to the magnetic domain wall displacement detection, presence of a mark is detected making use of the fact that, when a magnetic domain wall of an expansion layer comes to a leading end of an isothermal region in which the temperature generated by a laser beam is higher than the Curie temperature, the magnetic domain wall moves quickly to a maximum temperature portion.

Where such magnetic domain wall displacement detection as described above is used to play back a magneto-optical disk, also when the magnetic domain wall comes to the trailing end of the isothermal region, the magnetic domain wall moves quickly to a maximum temperature portion. Therefore, a read signal (MO signal) by the magnetic domain wall displacement detection includes not only a data signal but also a ghost signal having an equal length to that of the data signal and having a level lower then that of the data signal after a delay of time of "isothermal region length÷linear velocity" from the data signal. If the ghost signal is played back together with the data signal, then it is difficult to play hack an information signal recorded in a high density and also it is difficult to play back a clock signal.

Thus, a technique for canceling a ghost has been proposed in Japanese Patent Laid-open No. Hei 11-296928 by the assignee of the present application. According to the technique, when the magnetic domain wall displacement detection is used to play back a magneto-optical disk, an external clock system is used to play hack a clock signal stably, and the clock signal is used to convert the level of a RF signal read from the magneto-optical disk into a digital signal so that ghost signal processing can be performed by digital signal processing to allow the data signal to be played back correctly.

However, in order to obtain a correct data signal using the technique disclosed in the document specified as above, a process for separating the data signal and the ghost signal from each other is required.

SUMMARY OF THE INVENTION

It is an object of the present invention to provide a phase error detection apparatus and method which can detect not only an error which occurs with a phase difference of a ghost signal from a data signal in a unit of a clock but also an error of the phase difference which appears in a shorter period than that of the clock.

It is another object of the present invention to provide a laser power control apparatus and method by which the playback laser power can be kept at an optimum level based not only on an error which occurs with a phase difference of a ghost signal from a data signal in a unit of a clock but also an error of the phase difference which appears in a shorter period than that of the clock.

It is a further object of the present invention to provide a magneto-optical recording and/or playback apparatus by which a data signal can be played back in a high S/N ratio from a magneto-optical disk making use of a ghost signal by the magnetic domain wall displacement detection while keeping the playback laser power at an optimum level.

In order to attain the objects described above, according to the present invention, the laser power is first controlled so that the time delay of a ghost may be a fixed multiple of a data detection clock. Then, the laser power is adjusted so that the time delay may be a fixed multiple of the clock nearest to the phase delay amount set in advance of a ghost which appears in the isothermal region with a laser power with which an optimum signal characteristic is obtained. In this instance, the level of the playback signal is detected as a sum of results of displacement of both of a magnetic wall at a leading end of the isothermal region and another magnetic wall at a trailing end of the isothermal region after the fixed multiple at the time.

In particular, according to the present invention, there is provided a phase error detection apparatus, including detection means for detecting, based on a reference pattern including a record mark which appears repetitively at predetermined bit intervals, an error appearing in a phase difference between a magnetic domain wall displacement which occurs with a leading end of an isothermal region formed on a recording medium by irradiation of a laser beam and another magnetic domain wall displacement which occurs with a trailing end of the isothermal region.

The phase error detection apparatus may detect an error of the phase difference which occurs in a unit of the clock signal or an error of the phase difference which appears in a unit of time shorter than a clock signal.

According to another aspect of the present invention, there is provided a phase error detection method for detecting an error appearing in a phase difference between a magnetic domain wall displacement which occurs with a leading end of an isothermal region formed on a recording medium by irradiation of a laser beam and another magnetic domain wall displacement which occurs with a trailing end of the isothermal region, including a step of detecting a reference pattern including a record mark which appears repetitively at predetermined bit intervals, and a step of detecting an error of the phase difference which appears in a unit of time shorter than a clock signal based on the detected reference pattern.

With the phase error detection apparatus and method, not only a phase difference in a unit of a clock of a ghost signal from a data signal but also another phase difference which appears in a time shorter than the clock can be detected.

According to a further aspect of the present invention, there is provided a laser power control apparatus, including phase error detection means for detecting, based on a reference pattern including a record mark which appears repetitively at predetermined bit number intervals, an error appearing in a phase difference between a magnetic domain wall displacement which occurs with a leading end of an isothermal region formed on a recording medium by irradiation of a playback laser beam and another magnetic domain wall displacement which occurs with a trailing end of the isothermal region, amplitude detection means for detecting an amplitude of the predetermined bit number period of the reference pattern based on a clock signal, and control means for controlling a playback laser power based on a result of the detection from the phase error detection means and a result of the detection from the amplitude detection means.

The phase error detection means detects an error of the phase difference which occurs in a unit of the clock signal. The control means may discriminate an error of the phase difference which occurs in a unit of the clock signal based on the amount of jitters of the clock signal. In this instance, the control means may set a playback laser power when the amount of jitters exhibits a bottom and a 5 T amplitude detected by the amplitude detection means exhibits a peak.

The phase error detection means detects an error of the phase difference which occurs in a unit of time shorter than the clock signal. In this instance, the control means may discriminate the error of the phase difference which occurs in a unit of the clock signal and discriminate also the error of the phase difference which occurs in a unit of time shorter than the clock signal. Further, the control means may set the playback laser power when the amount of jitters exhibits a bottom and a 5 T amplitude detected by the amplitude detection means exhibits a peak and besides the error of the phase difference exhibits a zero cross.

According to a still further aspect of the present invention, there is provided a laser power control method, including a step of detecting, based on a reference pattern including a record mark which appears repetitively at predetermined bit number intervals, an error appearing in a phase difference between a magnetic domain wall displacement which occurs with a leading end of an isothermal region formed on a recording medium by irradiation of a playback laser beam and another magnetic domain wall displacement which occurs with a trailing end of the isothermal region, a step of detecting an amplitude of the predetermined bit number period of the reference pattern based on a clock signal, and a step of setting a playback laser power based on a result of the detection by the step of detecting a phase error and a result of the detection by the step of detecting amplitude.

With the laser power control apparatus and method, the playback laser power can be kept at an optimum level using not only a phase difference in a unit of a clock of a ghost signal from a data signal but also another phase difference which appears in a time shorter than the clock can be detected.

According to a yet further aspect of the present invention, there is provided a magneto-optical recording and/or playback apparatus, including optical pickup means including a laser light source for emitting a laser beam, the optical pickup means being operable to irradiate the laser beam emitted from the laser light source upon a playback layer laminated on a record layer of a magneto-optical recording medium to read an information signal recorded on the record layer of the magneto-optical recording medium by magnetic domain expansions which appear in an isothermal region of the magneto-optical recording medium which appears in response to the laser beam and output a corresponding received light amount signal, playback signal generation means for generating a sum component of the magneto-optical signal and a difference component of the magneto-optical signal based on the received light amount signal outputted from the optical pickup means, and laser power control means for controlling a playback laser power to be supplied to the laser light source based on the sum component and the difference component of the magneto-optical signal supplied thereto from the playback signal generation means.

The laser power control means may include phase error detection means for detecting, based on a reference pattern including a record mark which appears repetitively at predetermined bit number intervals, an error appearing in a phase difference between a magnetic domain wall displacement which occurs with a leading end of the isothermal region formed on the recording medium by irradiation of the playback laser beam and another magnetic domain wall displacement which occurs with a trailing end of the isothermal region, amplitude detection means for detecting an amplitude of the predetermined number period of the reference pattern based on a clock signal, and control means for controlling a playback laser power based on a result of the detection from the phase error detection means and a result of the detection from the amplitude detection means.

With the magneto-optical recording and/or playback apparatus, a data signal can be played back at a high S/N ratio from a magneto-optical disk making use of a ghost signal by magnetic wall displacement detection while the playback laser power is kept at an optimum level.

DETAILED DESCRIPTION OF THE PREFERRED EMBODIMENTS

A preferred embodiment of the present invention is described in detail below with reference to the accompanying drawings.

The present embodiment is formed as a magneto-optical disk recording and/or playback apparatus which plays back data through the magnetic domain wall displacement detection (DWDD) from a magneto-optical disk (MO disk) on which data are recorded in a high density.

First, the principle of the magnetic domain wall displacement detection is described. The magnetic domain wall displacement detection makes it possible to play back data of a magneto-optical disk, on which data are recorded in a high density, in order to realize high density recording and playback of a magneto-optical disk which is a recording medium which allows rewriting of an information signal. The magnetic domain wall displacement detection is a technique for expanding the magnetic domain of a mark smaller than a light spot for playback through a distribution of heat generated by the light spot to read the mark. The magnetic domain wall displacement detection is suitable for playback of a magneto-optical disk which adopts the "mark edge recording" because it can detect an edge of a mark clearly.

Figure 1A:
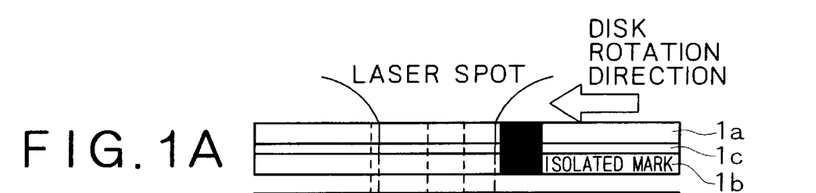
FIGS. 1A to 1J are cross sectional views illustrating a manner of magnetic domain expansion in a magneto-optical disk used in a magneto-optical disk recording and/or playback apparatus to which the present invention can be applied.
Figure 1B:
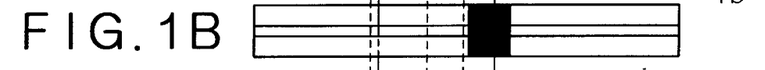
Figure 1C:
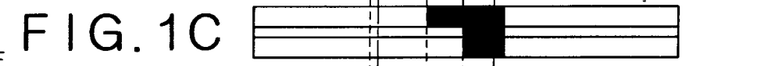
Figure 1D:
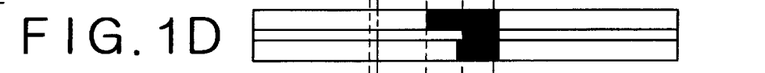
Figure 1E:
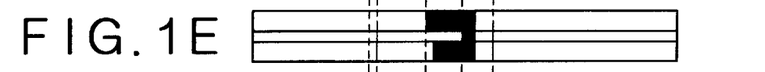
Figure 1F:
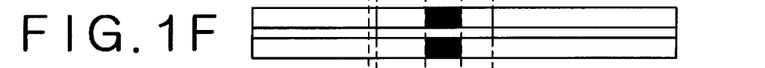
Figure 1G:
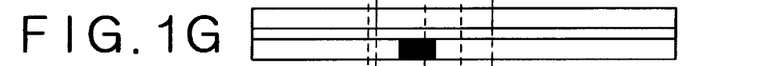

Referring to FIGS. 1A to 1J, the magneto-optical disk 1 for which the magnetic domain wall displacement detection is performed includes an expansion layer 1a and a record layer 1b, and a switching layer 1c interposed between the expansion layer 1a and the record layer 1b. The principle of playback by the magnetic domain wall displacement detection is described using an isolated mark. In particular, presence of an isolated mark is detected making use of the fact that, when the magnetic domain wall of the expansion layer 1a approaches the leading end of an isothermal region, in which the temperature raised by a laser beam is higher than the Curie temperature, as seen in FIGS. 1A and 1B, the magnetic domain wall moves quickly to a maximum temperature portion in the step of FIG. 1C. It is to be noted that the steps of FIGS. 1A to 1J illustrate a transition of the magnetic domain in the expansion layer 1a, switching layer 1c and record layer 1b which form the magneto-optical disk 1 in a process wherein the mark is displaced continuously with respect to the laser spot upon which a laser beam is irradiated.

Figure 1H:
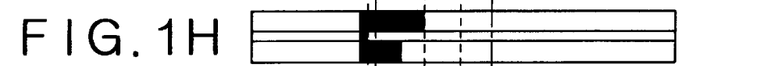
Figures 1I, 1J:
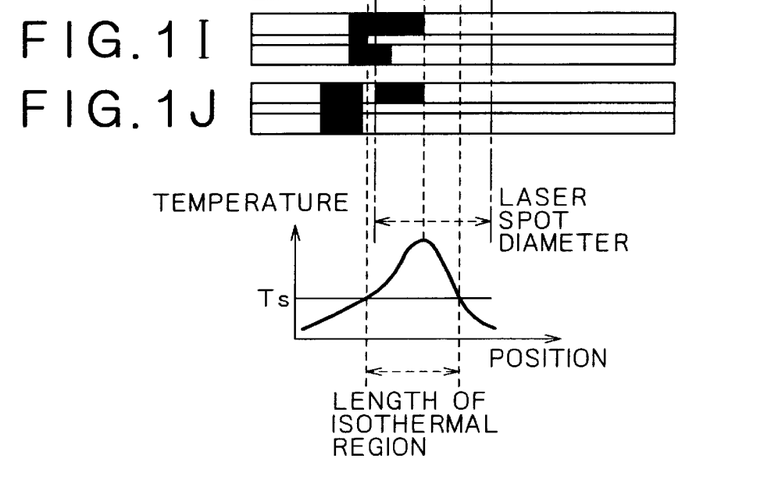

In the playback of the magneto-optical disk performed by such magnetic domain wall displacement detection, also when the magnetic domain wall comes to the trailing end of the isothermal region, the magnetic domain wall moves quickly to a maximum temperature portion as seen from FIG. 1H.

Figure 2A:
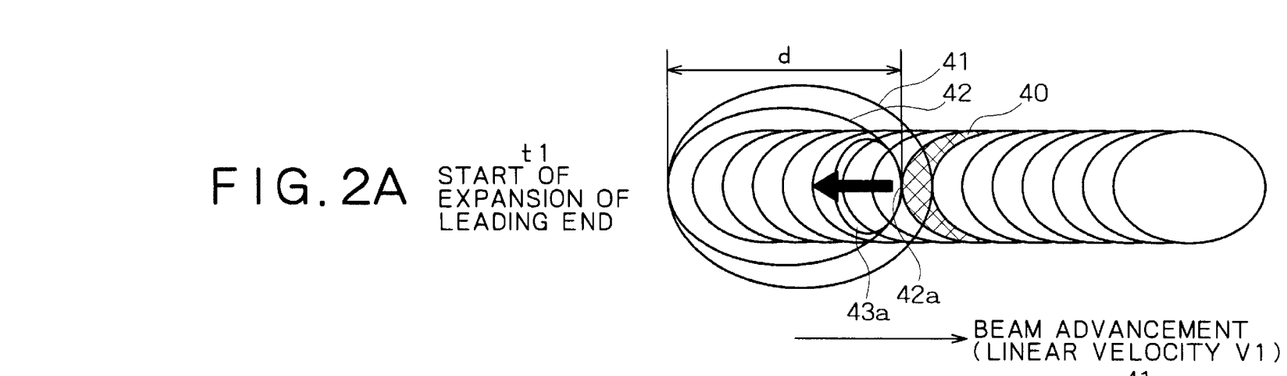
FIGS. 2A to 2C are diagrammatic views illustrating a ghost signal from an isolated mark.
Figure 2B:
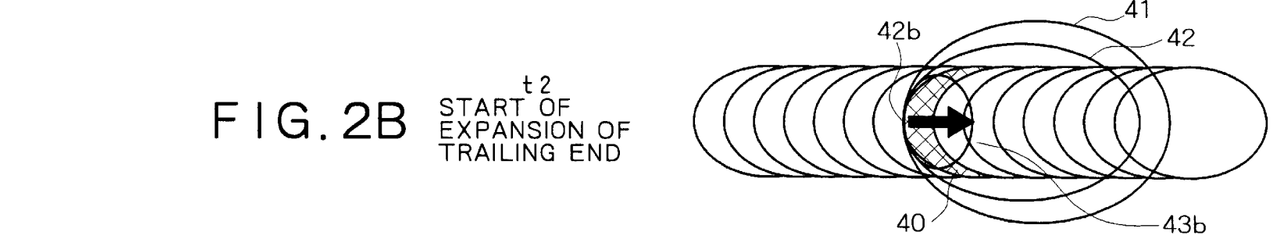
Figure 2C:
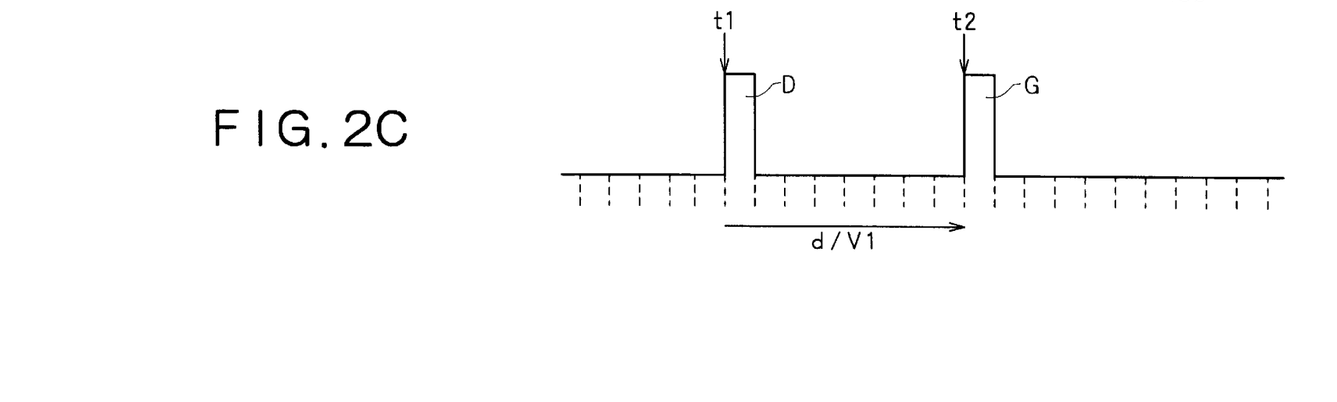

Now, expansion at the leading end and expansion at the trailing end of the isothermal region 42 of the magnetic domain wall of the isolated mark 40 are described in detail with reference to FIGS. 2A to 2C. First, as seen in FIG. 2A, a leading end expansion 43a appears at time t1 in the isothermal region 42 of the beam spot 41 for the isolated mark 40 by a magnetic domain wall displacement with respect to the leading end 42a of the magnetic domain wall of the isolated mark 40. A data signal D is obtained from the leading end expansion 43a appearing at time t1 as seen in FIG. 2C. However, at time t2 delayed by the equal length region length d÷linear velocity V1 from time t1 at which the leading end expansion is started, a trailing end expansion 43b by a magnetic domain wall displacement of the magnetic domain wall of the isolated mark 40 with respect to the trailing end 42b is generated as seen in FIG. 2B. Accordingly, a read signal (MO signal) by the magnetic domain wall displacement detection includes not only the data signal D but also a ghost signal G having a signal length equal to that of the data signal D and having a level lower than that of the data signal D at a time delayed by d/V1 mentioned above from the data signal D as seen in FIG. 2C. The read signal is a signal on which the levels of both of the data signal D and the ghost signal G are superposed.

The magneto-optical disk recording and/or playback apparatus to which the present invention is applied detects data making use of interference of both of the magnetic domain wall displacement from the leading end and the magnetic domain wall displacement from the trailing end of an isothermal region. In this instance, the playback laser power is controlled so that the phase delay of the magnetic domain wall displacement from the trailing end from the magnetic domain wall displacement from the leading end may be equal to a fixed multiple of the detection clock, for example, to n=5. This playback laser power control is performed using a pattern which exhibits repetitions of a reference mark at every other 5 bits. This pattern is used to control the phase difference of the magnetic domain wall displacement from the trailing end from the magnetic domain wall displacement from the leading end and is called displacement phase difference controlling pattern. The playback laser power is controlled so that the mark period of the displacement phase difference controlling pattern may be proximate to the length of the isothermal region. More particularly, the playback laser power is varied while the amplitude of the repetition mark of the displacement phase difference controlling pattern and the amount of jitters are detected. The playback laser power control is hereinafter described.

Now, a configuration and operation of the magneto-optical disk recording and/or playback apparatus to which the present invention is applied are described with reference to FIG. 3. A magneto-optical disk 1 loaded in the magneto-optical disk recording and/or playback apparatus is rotated at a predetermined speed by a spindle motor 2. Servo control of the speed of rotation of the spindle motor 2 is performed by a spindle control section 3. For example, the spindle control section 3 detects the speed of rotation of the spindle motor 2 from an FG pulse signal from the spindle motor 2 (a frequency signal synchronized with the speed of rotation of the spindle motor 2), compares the speed of rotation of the spindle motor 2 with reference speed information to detect error information and accelerates or decelerates the spindle motor 2 based on the error information thereby to cause the magneto-optical disk 1 to rotate at a required speed of rotation. A laser beam from an optical pickup 4 is irradiated upon the magneto-optical disk 1 being rotated in this manner.

The optical pickup 4 is configured in the following manner. In particular, the optical pickup 4 includes a laser light source 5 for generating a laser beam, a collimator lens 6 for converting the laser beam into a parallel beam, a beam splitter 7 for splitting the parallel laser beam, an objective lens 8 serving as an output end of the laser beam, a polarizing beam splitter 9, a pair of condensers 10 and 11, and a pair of photo-detectors PD(I) 12 and PD(J) 13 for detecting reflected light of the laser beam from the magneto-optical disk 1. The objective lens 8 is supported for movement in a tracking direction and a focusing direction by a two-axis drive circuit 14.

Reading of data from the magneto-optical disk 1 is performed while the optical pickup 4 is moved in a radial direction of the magneto-optical disk 1. The magneto-optical disk 1 is supported for movement in a radial direction of the magneto-optical disk 1 by a thread mechanism not shown. Movement of the reading position by a great distance is performed by the thread mechanism. On the other hand, movement of the reading position by a small distance is performed by a tracking servoing movement of the objective lens 8 in a radial direction of the magneto-optical disk 1 by the two-axis drive circuit 14. Meanwhile, focusing control of the laser beam on a signal recording face of the magneto-optical disk 1 is performed by a focusing servoing movement of the spindle motor 2 toward or away from the magneto-optical disk 1 by the two-axis drive circuit 14.

Emission of a laser beam from the optical pickup 4 having the configuration described above and returning of the laser beam are described now. Divergent laser light emitted from the laser light source 5 is converted into a parallel beam by the collimator lens 6 and passes through the beam splitter 7, whereafter it is condensed by the objective lens 8 and irradiated upon the magneto-optical disk 1. Thereupon, the objective lens 8 is moved in a tracking direction and a focusing direction by the two-axis drive circuit 14 as described above.

The laser beam reflected from the magneto-optical disk 1 is introduced into the beam splitter 7 through the objective lens 8. The beam splitter 7 introduces the reflected laser beam to the polarizing beam splitter 9 side. The polarizing beam splitter 9 splits the reflected laser beam into two beams depending upon the polarity of magnetization of the magneto-optical disk 1. One of the two beams is irradiated upon the photo-detector PD(I) 12 through the condenser 10 while the other beam is irradiated upon the photo-detector PD(J) 13 through the condenser 11.

A laser drive section 15 performs on/off control and output level control of the laser light output from the laser light source 5 of the optical pickup 4.

For the photo-detectors PD(I) 12 and PD(J) 13 of the optical pickup 4, for example, a four-part split detector having four-part split light receiving areas is used. A matrix section 17 which is hereinafter described produces an MO(Sum) signal of a magneto-optical signal and so forth based on received light amount signals detected by the photo-detectors PD(I) 12 and PD(J) 13.

Figure 4A:
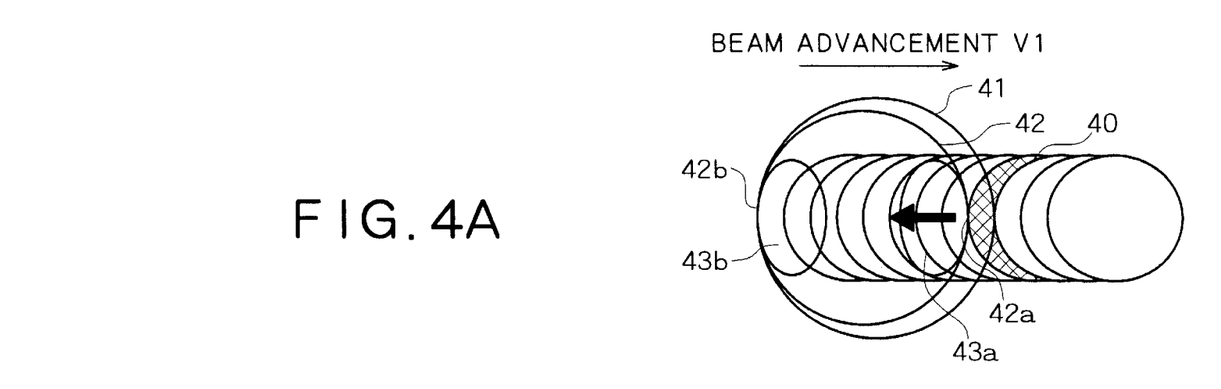
FIGS. 4A and 4B are diagrammatic views illustrating arrangements of a photo-detector in an optical pickup of the magneto-optical disk recording and/or playback apparatus of FIG. 3.
Figure 4B:
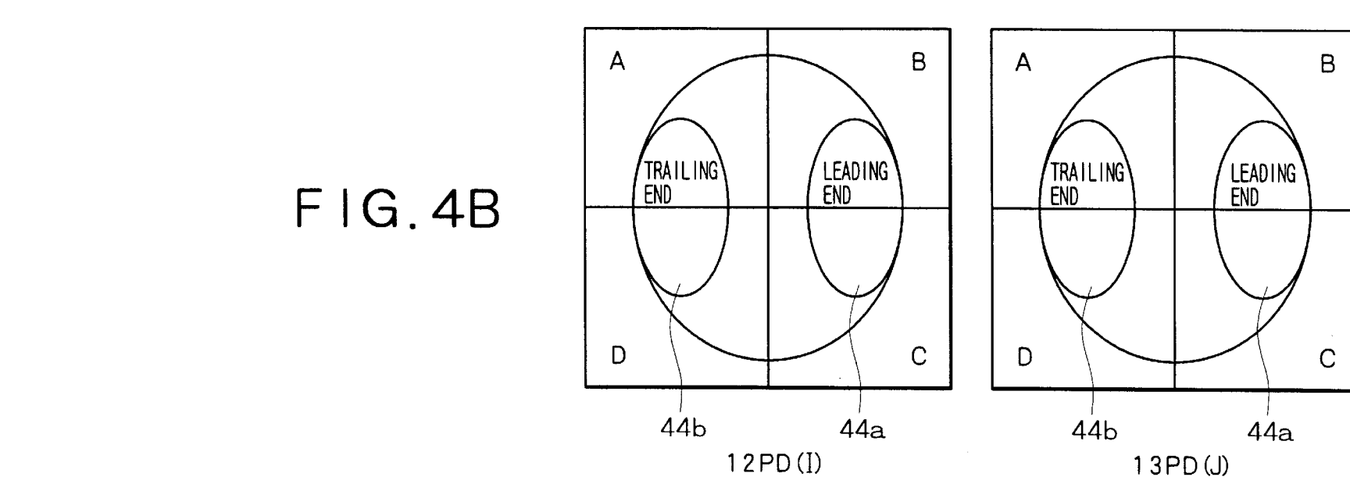

A relationship in arrangement of the leading end expansion and the trailing end expansion by the magnetic domain wall displacement appearing in an isothermal region of the beam spot irradiated upon the magneto-optical disk 1 from the optical pickup 4 and the light receiving areas of the photo-detectors PD(I) 12 and PD(J) 13 which receive the leading and trailing end expansions is illustrated in FIGS. 4A and 4B. Each of the photo-detectors PD(I) 12 and PD(J) 13 includes four divisional light receiving areas A, B, C and D as seen in FIG. 4B. Now, when the leading end expansion 43a by the magnetic domain wall displacement from the leading end 42a and the trailing end expansion 43b by the magnetic domain wall displacement from the trailing end 42b of the magnetic domain wall of the isolated mark 40 appear in the isothermal region 42 of the beam spot 41 for the isolated mark 40 shown in FIG. 4A, then a reflected leading end expansion 44a and a reflected trailing end expansion 44b are irradiated upon the light receiving areas A, B, C and D of each of the photo-detectors PD(I) 12 and PD(J) 13 such that they span the light receiving areas B and C and the light receiving areas A and D as seen in FIG. 4B, respectively. Naturally, this is based on an appropriate relationship between the positions of the optical system in the optical pickup 4 and the photo-detectors PD.

From each of the light receiving areas A, B, C and D of the photo-detectors PD(I) 12 and PD(J) 13, a received light amount signal which is an electric signal corresponding to a received light amount of the returning light from the magneto-optical disk 1 is outputted. Referring back to FIG. 3, the received light amount signals are supplied to an I–V conversion section 16. The current to voltage conversion section 16 performs current to voltage conversion of the received light amount signals. The received light amount signals after the conversion into electric signals by the current to voltage conversion section 16 are supplied to the matrix section 17.

The matrix section 17 performs arithmetic operation processing for the received light amount signals to generate a sum component MO(Sum) signal of the magneto-optical signal corresponding to data recorded on the magneto-optical disk 1 and a difference component MO(Def) signal of the magneto-optical signal for detecting a phase error which is hereinafter described. Further, the matrix section 17 generates a focusing error signal FE and a tracking error signal TE as well as a RF signal.

Expressions for matrix operation used when the matrix section 17 generates the MO(Sum) signal, MO(Def) signal, focusing error signal FE and tracking error signal TE mentioned above are given below. Here, the receive light amount signals obtained at the light receiving areas A, B, C and D of each of the photo-detectors PD(I) 12 and PD(J) 13 shown in FIG. 4B are represented by A, B, C and D, respectively.

First, arithmetic operation of the MO(Sum) signal of the magneto-optical signal is performed in accordance with the following expression (1):

$$MO(\text{Sum}) = \{PD(I)[A+D+B+C]\} - \{PD(J)[A+D+B+C]\} \qquad (1)$$

Arithmetic operation of the MO(Def) signal is performed in accordance with the following expression (2):

$$MO(\text{Def}) = \{PD(I)[A+D] - PD(I)[B+C]\} - \{PD(J)[A+D] - PD(J)[B+C]\} \qquad (2)$$

The focusing error signal FE is arithmetically operated in accordance with the following expression (3):

$$FE=\{PD(I)[A-C]-PD(I)[B+D]\}+\{PD(J)[A+C]-PD(J)[B+D]\} \quad (3)$$

The tracking error signal TE is arithmetically operated in accordance with the following expression (4):

$$TE=\{PD(I)[A-B-C-D]\}-\{PD(J)[A+B-C-D]\} \quad (4)$$

The focusing error signal FE and the tracking error signal TE generated by the matrix section 17 are supplied to a phase compensation circuit 18 which operates as a servo controller. The phase compensation circuit 18 generates a focusing drive signal based on the focusing error signal FE and generates a tracking drive signal based on the tracking error signal TE, and applies them to a focusing coil and a tracking coil (both not shown) of the two-axis drive circuit 14. Thus, a servo system for causing the objective lens 8 to converge a laser beam in a just focused state on a recording track of the magneto-optical disk 1 is formed.

Further, in the magneto-optical disk recording and/or playback apparatus, the read signal MO(Sum) of the magneto-optical disk 1 generated by the matrix section 17 passes through an automatic gain controller 19 and is converted into a digital signal by an A/D converter 20. The digital read signal from the analog to digital converter 20 thus makes, where the original recording signal train is represented as b(n), an output signal y(n) represented by the following expression (5):

$$y(n)=b(n)+0.5b(n-5) \quad (5)$$

where "0.5" is the signal amplitude ratio between the leading end expansion and the trailing end expansion described above, and "5" is the phase difference between the leading end expansion and the trailing end expansion. Here, the playback laser power is initially set based on the displacement phase difference controlling pattern described above so that the trailing end expansion signal (ghost) may exhibit a delay by 5 bits. Such setting of the playback laser power is hereinafter described.

Now, the principle for obtaining the original recording signal string b(n) from the output signal y(n) given by the expression (5) above is described below. Further, the expression (5) above is developed as given by the following expression (6):

$$\begin{aligned} b(n) &= y(n) - 0.5b(n-5) \quad (6)\\ &= y(n) - 0.5(y(n-5) - 0.5b(n-10))\\ &= y(n) - 0.5(y(n-5) - 0.5(y(n-10) - 0.5b(n-15)))\end{aligned}$$

The expression (6) can be modified into the following expression (7) for easier recognition:

$$\begin{aligned} b(n) &= y(n) - 0.5y(n-5) + 0.25y(n-10) - 0.125y(n-15) \quad (7)\\ &= \sum (-0.5)^i y(n-5i)\end{aligned}$$

The original output signal string b(n) can be regenerated from the output signal y(n) by arithmetic operation using the clock fixed multiple n corresponding to the phase delay of the trailing end expansion from the leading end expansion in the expression (7) given above.

The output signal string b(n) is supplied to an encoder/decoder 21. The encoder/decoder 21 performs data decoding processing of the read signal in the form of a digital signal supplied thereto from the analog to digital converter 20, that is, the output signal string b(n), based on a bit timing signal generated by a timing generator 32. Playback data which is an output of the encoder/decoder 21 is supplied from an input/output terminal 22 through an interface section not shown to a host computer or the like not shown.

On the other hand, if a write signal is supplied to the encoder/decoder 21 through the input/output terminal 22 from the host computer or the like, then the encoder/decoder 21 encodes the write signal and supplies the encoded write signal to a magnetic head 24 through a magnetic head drive circuit 23. In other words, the encoder/decoder 21 performs modulation processing, addition processing of an error correction code and so forth of data to be recorded onto the magneto-optical disk 1 supplied from the host computer. In this instance, the encoder/decoder 21 performs predetermined processing based on the bit timing signal supplied thereto from the timing generator 32. The recording data supplied from the encoder/decoder 21 is supplied through the magnetic head drive circuit 23 to the magnetic head 24. The magnetic head 24 thus generates a magnetic field corresponding to the write signal supplied thereto and applies the magnetic field to the magneto-optical disk 1.

Meanwhile, the RF signal, MO(Sum) signal and MO(Def) signal generated by the matrix section 17 are supplied to a laser power control section 30 which is a laser power control apparatus to which the present invention is applied.

The laser power control section 30 controls the playback laser power of the optical pickup 4. Initially, the laser power control section 30 controls the laser power so that the time delay of the ghost signal from the data signal may be equal to the fixed multiple n of the data detection clock as described hereinabove with reference to FIGS. 2A to 2C. In this instance, the laser power control section 30 searches, based on the RF signal, for the laser power at which the amount of jitters appearing in the clock is small. Then, the laser power control section 30 adjusts the playback laser power so that the time delay of the ghost signal from the data signal may be the fixed multiple n=5 of the clock nearest to the phase delay amount set in advance of a ghost which appears in the isothermal region with a laser power with which an optimum signal characteristic is provided. In this instance, the laser power control section 30 searches for a peak of the 5 T amplitude of the displacement phase difference controlling pattern.

A configuration of the laser power control section 30 is described with reference to FIG. 3. The laser power control section 30 includes a sector detection section 31 for detecting a record mark recorded for each sector from the RF signal generated by the matrix section 17, a timing generator 32 for generating a clock signal of a predetermined frequency from the record mark recorded for each sector, a 5 T amplitude detection circuit 33 for detecting a mark amplitude (5 T) of the displacement phase difference controlling pattern from the MO(Sum) signal detected by the matrix section 17, a phase error detection circuit 34 for detecting an error of a phase difference appearing in a unit of the clock signal and an error of a phase difference appearing in a unit of time shorter than the clock signal, a digital signal processor (DSP) 35 for generating a laser power signal based on results of the phase error detection by the phase error detection circuit 34 and a result of the 5 T amplitude detection by the 5 T amplitude detection circuit 33, and a power setting circuit 36 for setting the playback layer power based on the laser power control signal.

The timing generator 32 generates a clock signal from a result of the detection of the sector detection section 31 by means of a phase locked loop (PLL). The clock signal generated by the timing generator 32 is supplied to the 5 T amplitude detection circuit 33, phase error detection circuit 34 and so forth. It is to be noted that the displacement phase difference controlling mark is recorded in each sector detected by the sector detection section 31, and therefore, the timing generator 32 may generate the clock signal based on the displacement phase difference controlling mark.

The phase error detection circuit 34 detects a phase error between a magnetic domain wall displacement at the leading end of the isothermal region and another magnetic domain wall displacement at the trailing end of the isothermal region which occurs in a shorter time than the unit of the clock signal. The detection of the phase error by the phase error detection circuit 34 is performed based on the MO(Sum) signal and the MO(Def) signal supplied thereto from the matrix section 17.

The 5 T amplitude detection circuit 33 detects the mark amplitude of the displacement phase difference controlling pattern and supplies a result of the detection to the DSP 35.

The DSP 35 discriminates, based on the amount of jitters detected from the clock signal generated by the timing generator 32 whether or not the phase delay of the magnetic domain wall displacement from the trailing end from the magnetic domain wall displacement from the leading end of the isothermal region is equal to the fixed multiple of the data detection clock. The amount of jitters of the PLL part of the timing generator 32 decreases when the length of the isothermal region which varies depending upon the playback laser power becomes equal to the fixed multiple of that of the clock mark. Accordingly, the DSP 35 determines that, where the amount of jitters is small, the phase delay is equal to the fixed multiple of the data detection clock. Further, the DSP 35 discriminates a peak of the mark amplitude detected by the 5 T amplitude detection circuit 33. If the length of the isothermal region becomes equal to the mark period of the displacement phase difference controlling pattern as a result of the adjustment of the playback laser power, then the magnetic domain wall displacements of the leading end and the trailing end are synchronized with each other and the mark amplitude (5 T) exhibits a peak. Consequently, a peak of the 5 T amplitude detected by the DSP 35 indicates that the length of the isothermal region and the mark period of the displacement phase difference controlling pattern are equal to each other.

Then, the DSP 35 generates a playback laser power control signal for setting the playback laser power to a level with which the amount of jitters is small and the 5 T amplitude exhibits a peak, and supplies the playback laser power control signal to the power setting circuit 36.

The laser power set by the power setting circuit 36 is supplied to the laser drive section 15. Then, the laser drive section 15 drives the laser light source 5 so that a laser beam for playback is emitted from the laser light source 5.

Now, detailed operation of the laser power control section 30 is described. First, operation of the laser power control section 30 when it detects a phase error of magnetic expansions, which appear at the leading end and the trailing end of the isothermal region, in a unit of the clock based on the displacement phase difference controlling pattern is described in detail with reference to FIG. 5. This processing selects an appropriate one of the waveforms of FIGS. 5B, 5C, 5D and 5E wherein the phase delay of the magnetic domain wall displacement from the trailing end from the magnetic domain wall displacement from the leading end of the isothermal region becomes equal to a fixed multiple of the data detection clock, and as a result, the amount of jitters of the PLL section is reduced.

Figure 5A:
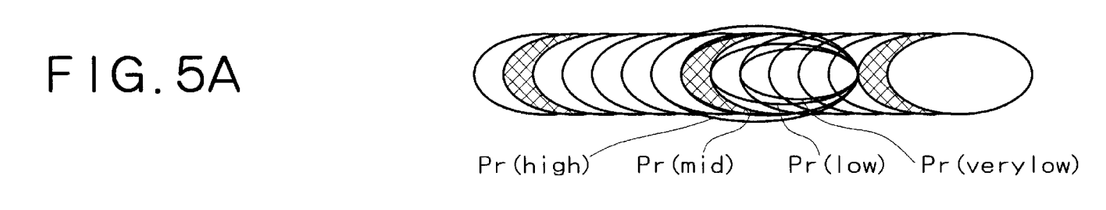
FIGS. 5A to 5E are diagrammatic views illustrating a manner in which a phase error of magnetic domain expansion which occurs from a leading end and a trailing end of an isothermal region of a beam spot is detected in a unit of a clock.
Figure 5B:
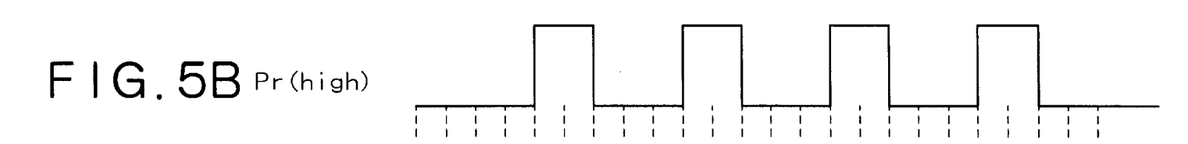
Figure 5C:
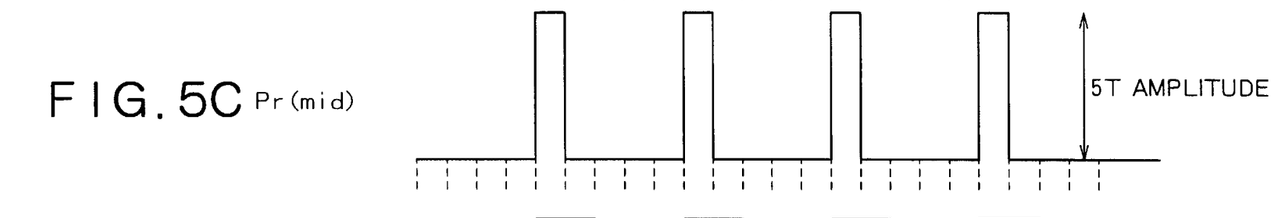
Figures 5D, 5E:
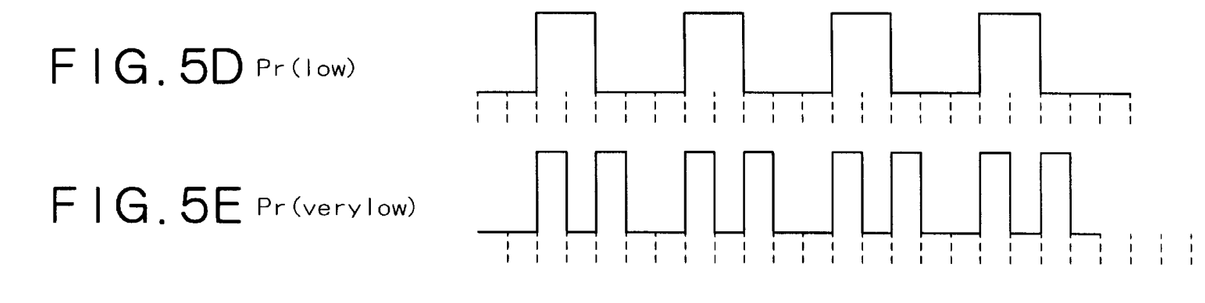

If the laser power control section 30 raises the laser power gradually, then a great 5 T amplitude can be detected as seen from the waveform of FIG. 5C. This is because, when the power of the laser light source for emitting the playback laser beam is raised gradually, the length of the isothermal region becomes equal to the mark period of the displacement phase difference controlling pattern and the magnetic domain wall displacements of the leading end and the trailing end are synchronized with each other thereby to increase the mark amplitude.

Figure 6:
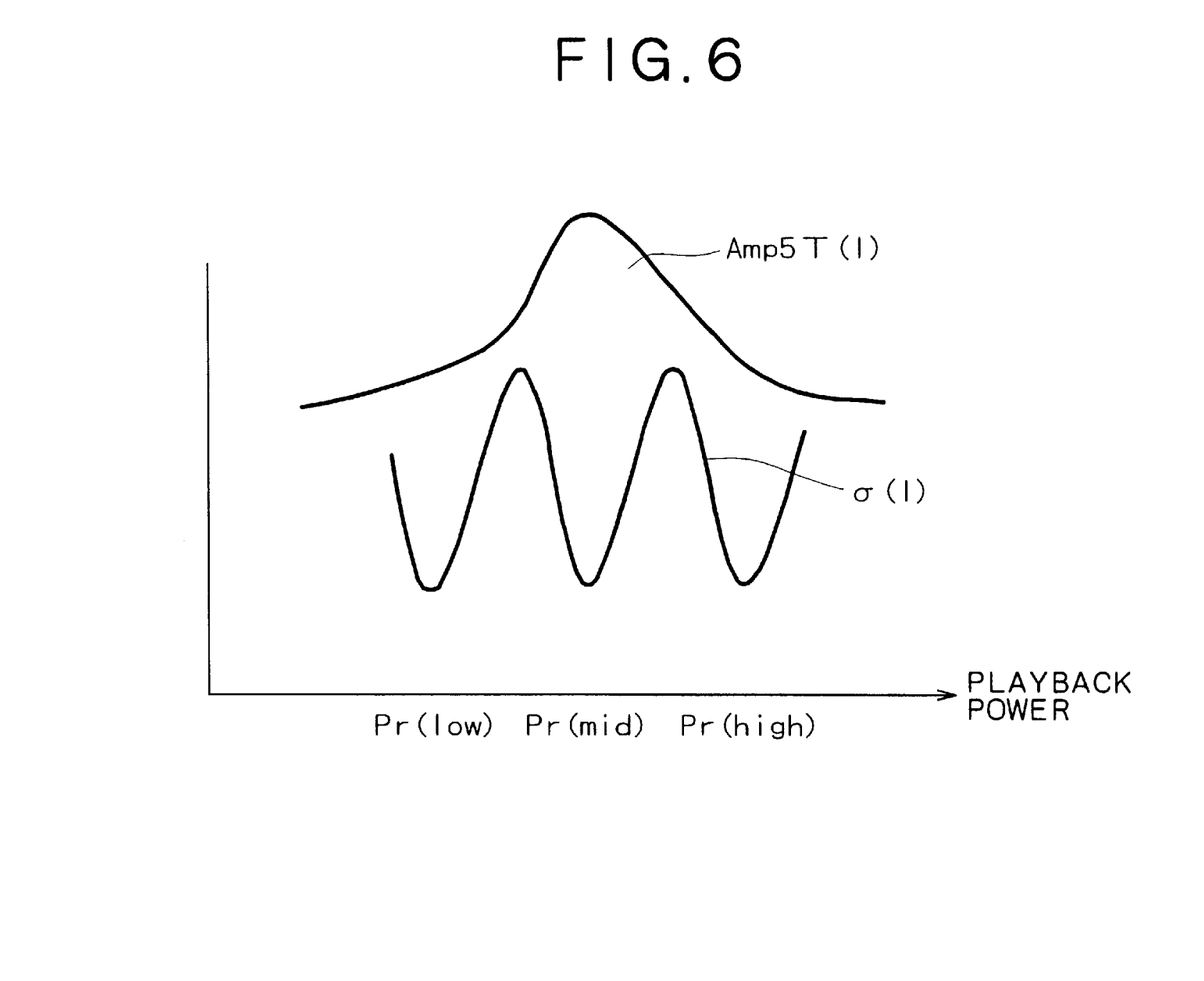
FIG. 6 is a characteristic diagram illustrating a dependency of jitters and a 5 T amplitude upon the playback laser power.

Accordingly, in the present embodiment, the laser power is set to a playback laser power Pr(mid) where the jitter amount σ (I) exhibits a bottom and the intensity Amp5 T(I) of the 5 T amplitude is great as seen in FIG. 6.

Figure 7:
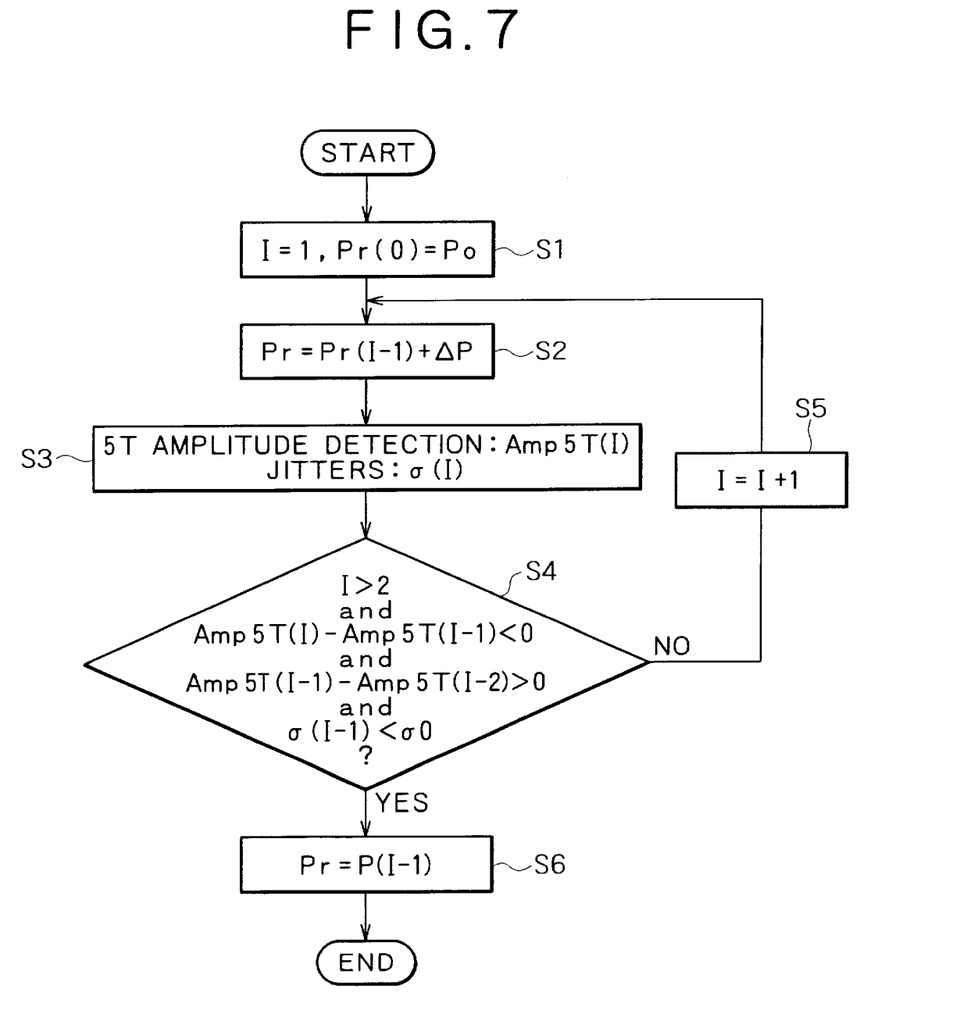
FIG. 7 is a flow chart illustrating an algorithm for roughly setting an optimum laser power.

A setting algorithm for the playback laser power is described with reference to FIG. 7. First in step S1, the parameter I is set to I=1 and the laser power Pr(0) for the initial stage is set to P0 (laser power Pr=P0). Then, the laser power Pr is raised a little (ΔP) in step S2.

Then in step S3, the 5 T amplitude detection circuit 33 is used to detect the intensity Amp5 T(I) of the 5 T amplitude. Meanwhile, the DSP 35 detects the jitter amount σ (I).

Then in step S4, it is discriminated whether or not I>2 and the intensity Amp5 T(I) of the 5 T amplitude exhibits a peak while the jitter amount σ (I) exhibits a bottom using the DSP 35. The discrimination of whether or not the intensity Amp5 T(I) of the 5 T amplitude exhibits a peak can be made by discriminating whether or not both of Amp5 T(I)−Amp5 T(I−1)<0 and Amp5 T(I−1)−Amp5 T(I−2)>0 are satisfied, that is, whether or not the inclination of the characteristic of the 5 T amplitude shown in FIG. 6 (the mountain-shaped curve having a peak at the highest point of the characteristic) exhibits a changeover between an ascending inclination and a descending inclination.

If the DSP 35 discriminates that the conditions in step S4 are not satisfied (No), then the processing advances to step S5, in which I is incremented by 1, whereafter the processing returns to step S2 so that the processing in the steps beginning with step S2 is repeated. Then, if the DSP 35 discriminates finally that the conditions in step S4 are satisfied (Yes), then the processing advances to step S6, in which the playback laser power is set.

In other words, the laser power control section 30 repeats raising the laser power and storing, at a point of time when the amount of jitters of the clock for the PLL section of the timing generator 32 exhibits a bottom, the intensity Amp5 T(I) of the 5 T amplitude then, and sets the laser power then to the playback laser power when it discriminates that the intensity Amp5 T(I) of the 5 T amplitude exhibits a peak.

Since the magneto-optical disk recording and/or playback apparatus of the present embodiment has such a laser power control section 30 as described above built therein, it can set an optimum playback laser power.

Setting of the playback laser power is performed in such a manner as described above. In the setting, based on the clock signal generated by the timing generator 32, a fixed multiple of the clock signal such as, for example, 5 clocks is used as a reference for determination of the phase difference of the trailing end expansion from the leading end expansion of the magnetic domain wall, and a displacement in a unit of one clock with respect to the 5 clocks is called in question.

Actually, however, as the laser power is raised, also a phase error between the occurrence timing of the magnetic domain wall displacement at the leading end of the isothermal region and the occurrence timing of the magnetic domain wall displacement at the trailing end of the isothermal region occurs in a shorter time than the unit of the clock signal. In the following, control of the playback laser power where a small displacement of the phase error between the leading end expansion and the trailing end expansion within the clock signal is taken into consideration is described.

Figure 8A:
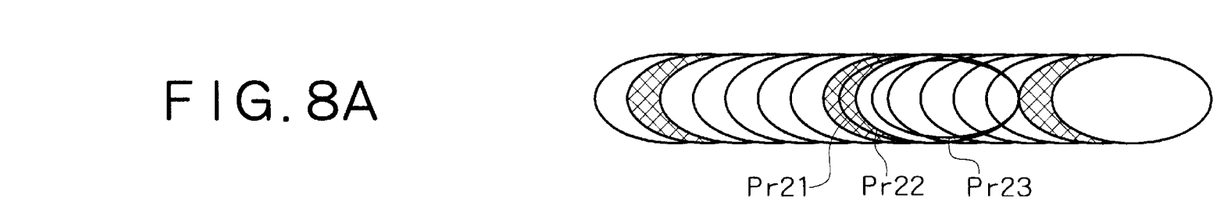
FIGS. 8A to 8D are diagrammatic views illustrating appearance of an error within a clock of a phase error of magnetic domain expansion which occurs from a leading end a trailing end of an isothermal region of a beam spot.
Figure 8B:
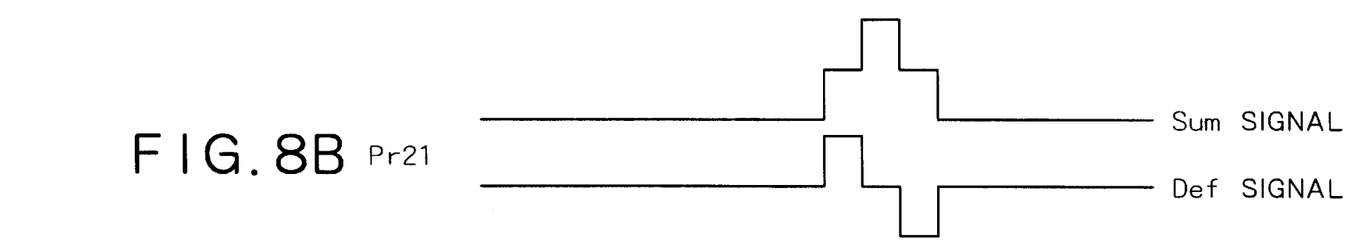
Figure 8C:
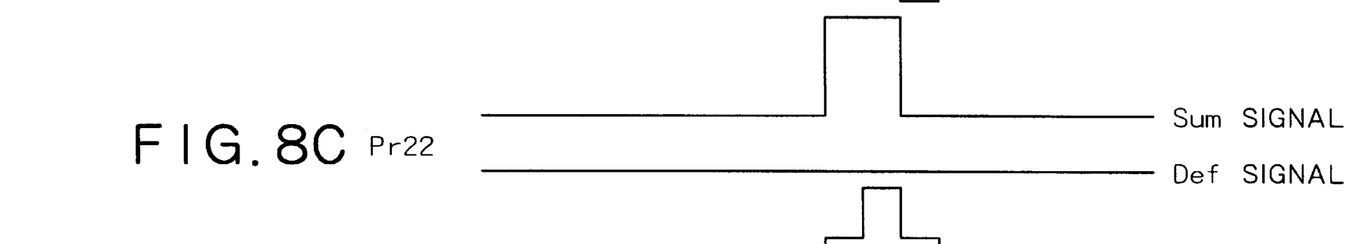
Figure 8D:
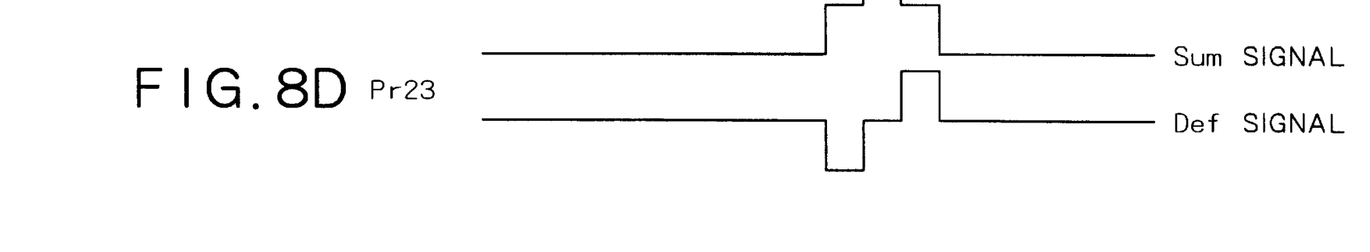

When the phase is displaced a little, it is not known whether it is displaced in the delaying direction or the leading direction, and the direction of the displacement must be discriminated. For example, when the isothermal region at a laser power Pr22 in FIG. 8A is not displaced from the clock signal, even if a magnetic domain wall expansion appears at the leading end and the trailing end of the isothermal region, since the MO(Sum) signal has the same phase as seen in FIG. 8C, the MO(Def) signal is 0. On the other hand, when the isothermal region at a playback laser power Pr21 or Pr23 is displaced from the clock signal, the MO(Sum) signal does not have the same phase as seen in FIG. 8B or 8D and also the MO(Def) signal exhibits a difference in polarity. Therefore, the polarity of the phase error signal is extracted and fed back to the playback laser power.

To this end, such processing as described below with reference to FIG. 9 is executed by the phase error detection circuit 34 of the laser power control section 30.

Figures 9A, 9B:
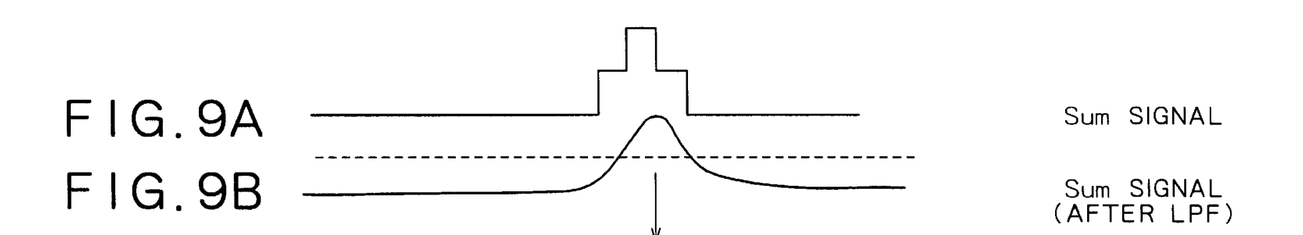
FIGS. 9A to 9H are timing charts illustrating appearance of an error within a clock of a phase error of magnetic domain expansion.
Figures 9C, 9D:
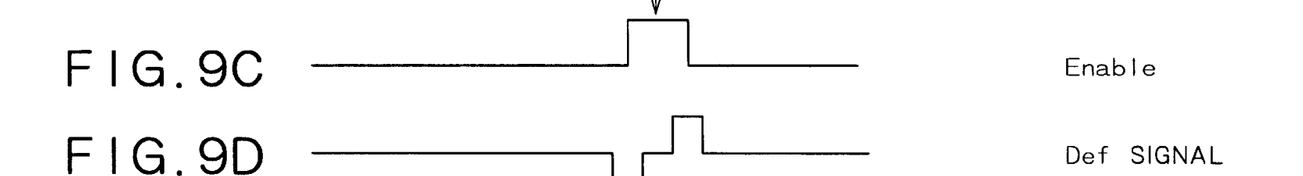
Figure 9E:
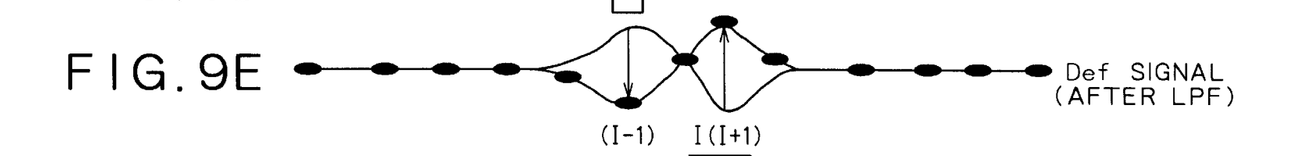
Figure 9F:
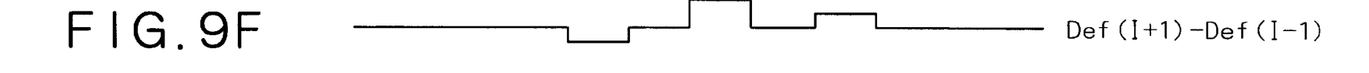
Figure 9G:
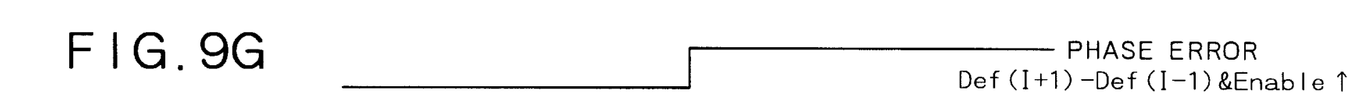
Figure 9H:
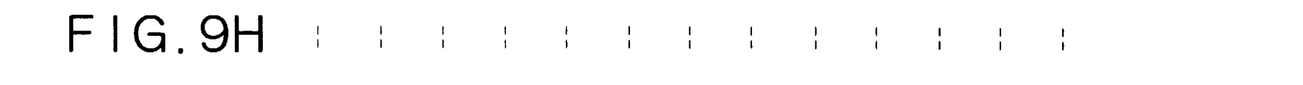
Figure 10:
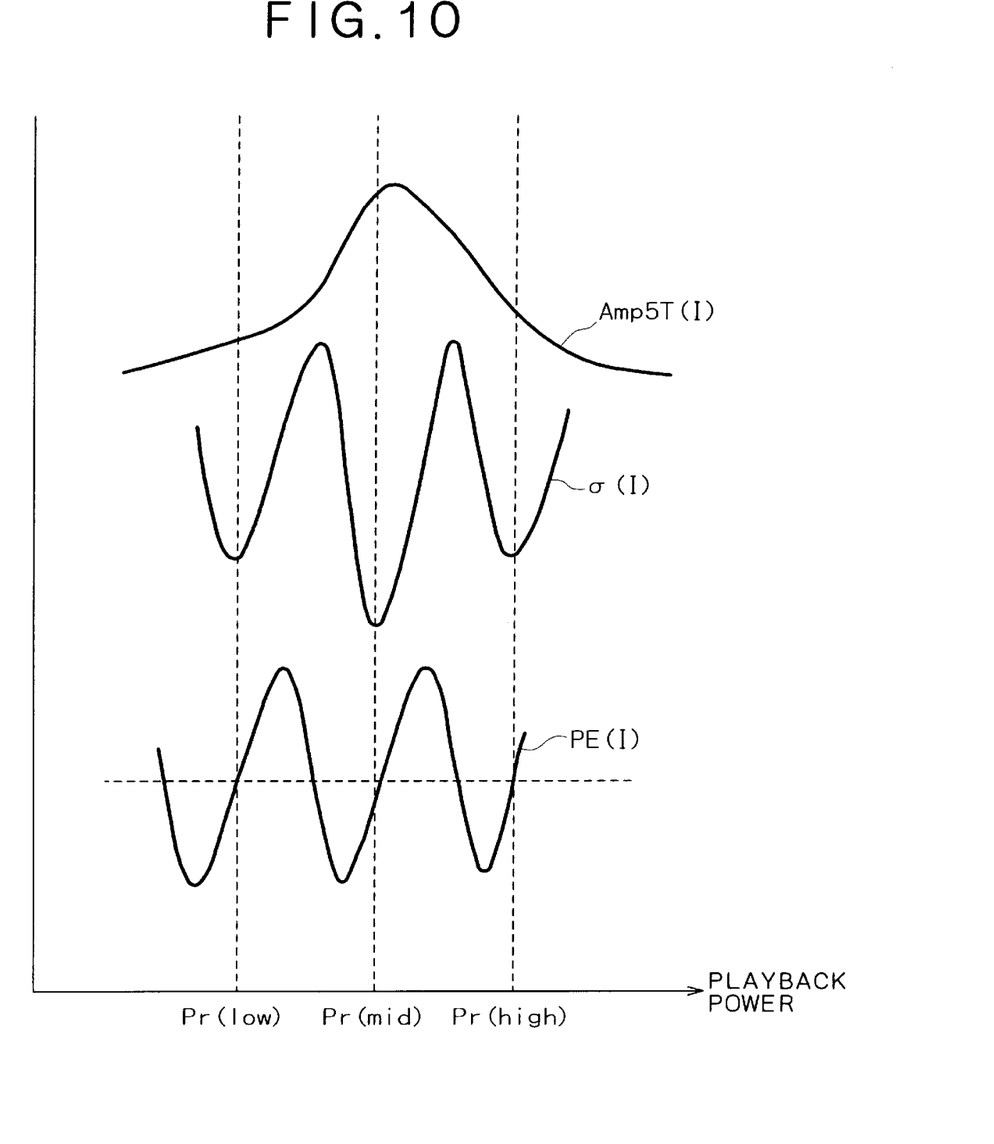
FIG. 10 is a characteristic diagram illustrating a dependency of jitters, a 5 T amplitude and a phase error upon the playback power.

First, the MO(Sum) signal (FIG. 9A) supplied from the matrix section 17 is supplied to a low-pass filter (LPF), from which a filtered Sum signal (FIG. 9B) is obtained. The Sum signal is cut with a suitable threshold level and converted into an Enable signal shown in FIG. 9C. Also an MO(Def) signal (FIG. 9D) supplied from the matrix section 17 is supplied to another LPF, from which a filtered Def signal (FIG. 9E) is obtained. Then, a difference Def(I+1)−Def(I−1) at points I+1 and I−1 before and after I where the zero-cross point is represented by I is determined (FIG. 9F). The difference and the Enable signal of FIG. 9C are logically ANDed to determine a phase error Def(I+1)−Def(I−1) &Enable↑ shown in FIG. 9G. The phase error Def(I+1)− Def(I−1)&Enable↑ is supplied to the DSP 35.

The DSP 35 sets the playback laser power Pr in accordance not only with the timing of a peak of the intensity Amp5 T(I) of the 5 T amplitude obtained by the 5 T amplitude detection circuit 33 and the timing at which the jitter amount σ (I) exhibits a bottom but also with the timing at which the polarity of the phase error PE(I) detected by the phase error detection circuit 34 changes.

Detailed setting of the playback laser power is allowed by adding the setting in which the phase error is used to the setting of the laser power described hereinabove with reference to FIGS. 6 and 7. Processing of the detailed setting of the playback laser power is illustrated in FIG. 11.

Figure 11:
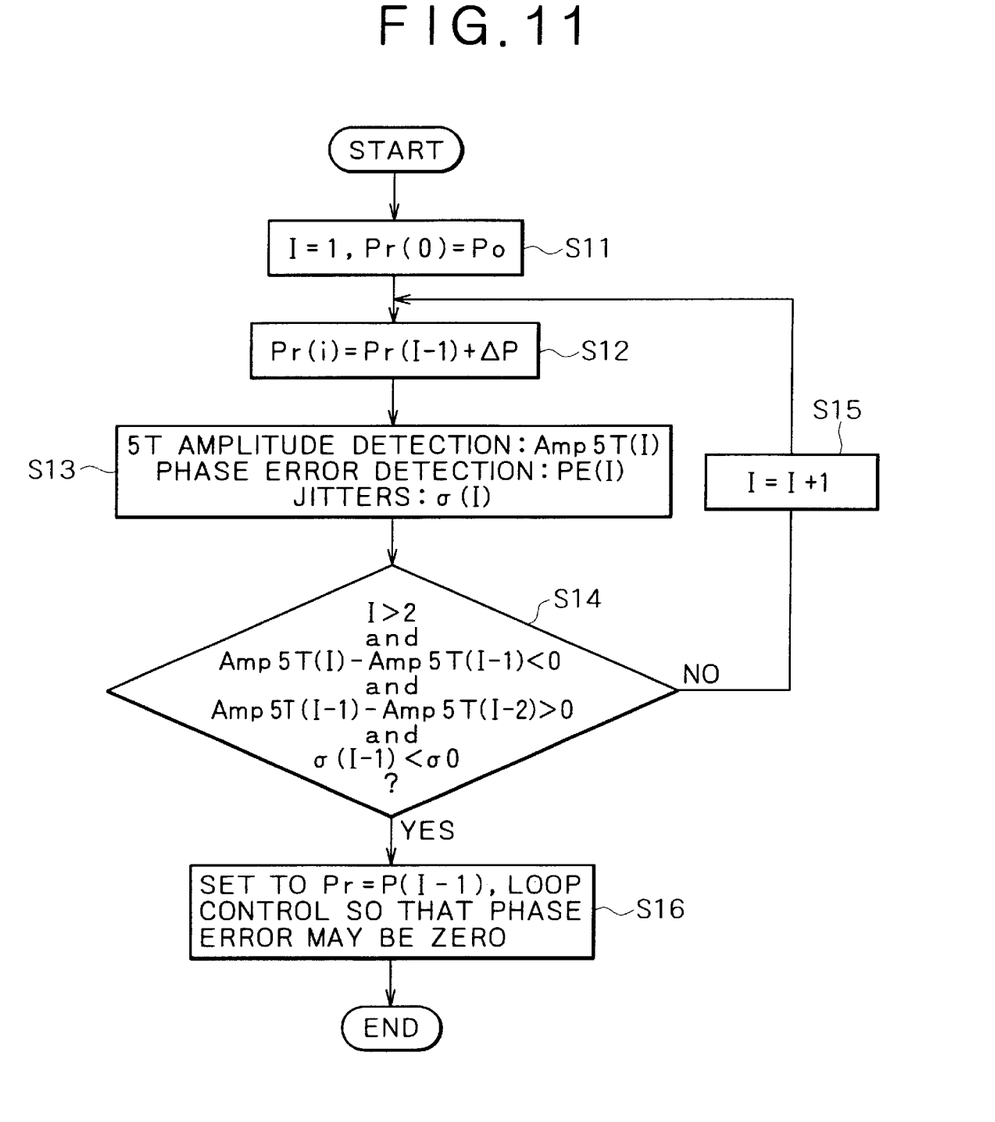
FIG. 11 is a flow chart illustrating detailed setting of an optimum laser power.

Referring to FIG. 11, the parameter I is set to I=1 and the initial laser power Pr(0) is set to P0 (Pr=P0) first in step S11. Then in step S12, the laser power Pr is raised a little (ΔP).

Then in step S13, the 5 T amplitude detection circuit 33 is used to detect the intensity Amp5 T(I) of the 5 T amplitude Further, the DSP 35 detects the jitter amount σ (I). Furthermore, the phase error detection circuit 34 is used to detect phase error the PE(I).

Then in step S14, the DSP 35 discriminates whether or not I>2 and the intensity Amp5 T(I) of the 5 T amplitude exhibits a peak while the phase error PE(I−1) is smaller than PE0 and the jitter amount σ (I) exhibits a bottom. The discrimination of whether or not the intensity Amp5 T(I) of the 5 T amplitude exhibits a peak can be made by discriminating whether or not both of Amp5 T(I)−Amp5 T(I−1)<0 and Amp5 T(I−1)−Amp5 T(I−2)>0 are satisfied, that is, whether or not the inclination of the characteristic of the 5 T amplitude shown in FIG. 6 (the mountain-shaped curve having a peak at the highest point of the characteristic) exhibits a changeover between an ascending inclination and a descending inclination.

If the DSP 35 discriminates that the conditions in step S14 are not satisfied (No), then the processing advances to step S15, in which I is incremented by 1, whereafter the processing returns to step S12 so that the processing in the steps beginning with step S12 is repeated. Then, if the DSP 35 discriminates finally that the conditions in step S14 are satisfied (Yes), then the processing advances to step S16, in which detailed setting of an optimum playback laser power is performed. In particular, the DSP 35 sets the laser power Pr to Pr P(I−1) and performs loop control so that the phase error may be zero.

Figure 3:
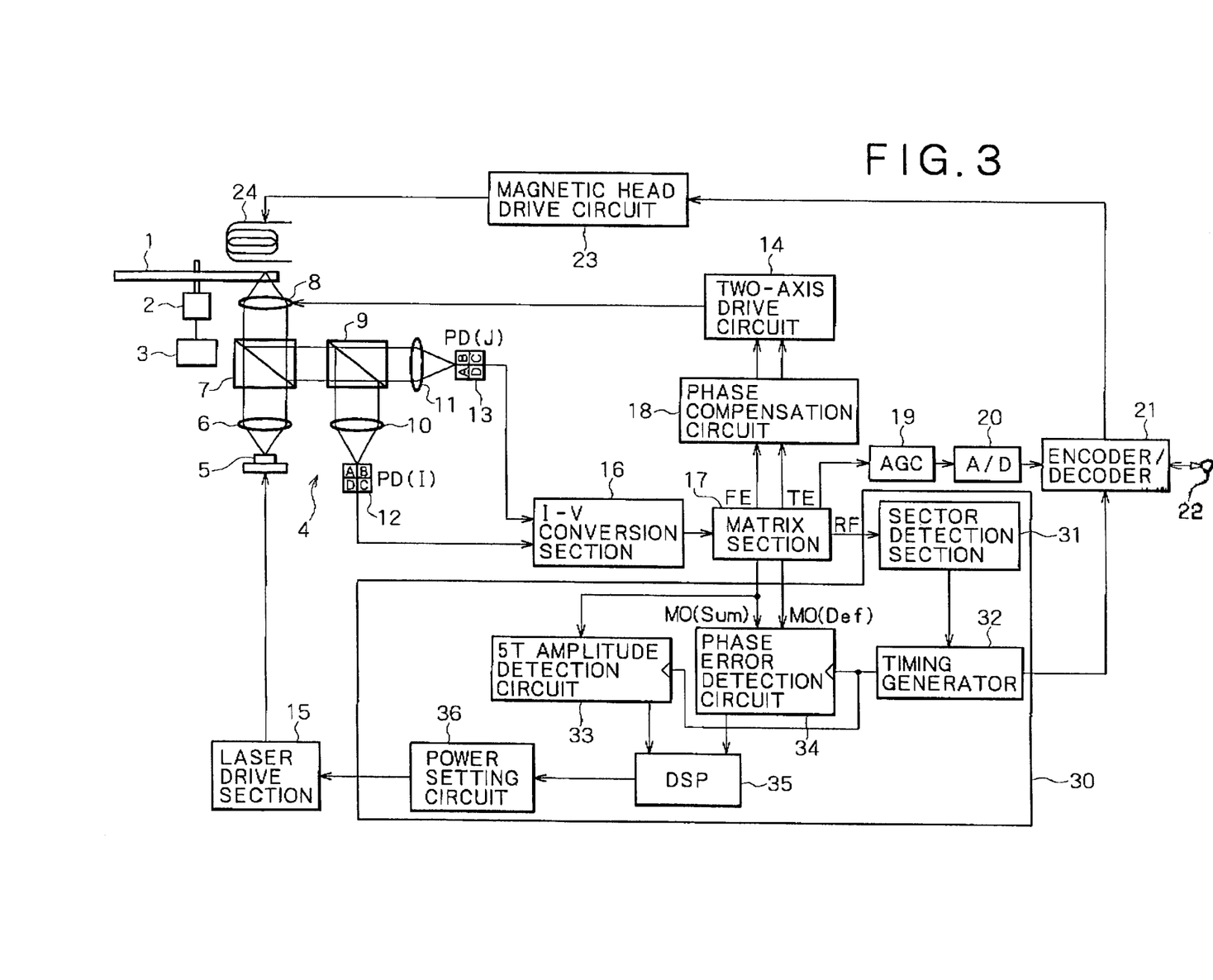
FIG. 3 is a block diagram showing a configuration of a magneto-optical disk recording and/or playback apparatus to which the present invention is applied.

As described above, since the magneto-optical disk recording and/or playback apparatus shown in FIG. 3 includes the laser power control section 30, while it keeps the playback laser power at an optimum level, it can play back a data signal from a magneto-optical disk with a high S/N ratio making use of a ghost signal by magnetic domain wall displacement detection.

Since the laser power control section 30 includes the phase error detection circuit 34, not only the phase error of the ghost signal from the data signal in a unit of the clock signal but also the phase difference which appears in a shorter time than the clock signal can be used for control of the playback laser power.

While a preferred embodiment of the present invention has been described using specific terms, such description is for illustrative purposes only, and it is to be understood that changes and variations may be made without departing from the spirit or scope of the following claims.

What is claimed is:

1. A phase error detection apparatus, comprising:
   detection means for detecting, based on a reference pattern including a record mark which appears repetitively at predetermined bit intervals, an error appearing in a phase difference between a magnetic domain wall displacement which occurs with a leading end of an isothermal region formed on a recording medium by irradiation of a laser beam and another magnetic domain wall displacement which occurs with a trailing end of the isothermal region,
   wherein said detection means detects an error of the phase difference which appears in a unit of time shorter than a clock signal.

2. A phase error detection method for detecting an error appearing in a phase difference between a magnetic domain wall displacement which occurs with a leading end of an isothermal region formed on a recording medium by irradiation of a laser beam and another magnetic domain wall displacement which occurs with a trailing end of the isothermal region, comprising: detecting a reference pattern including a record mark which appears repetitively at predetermined bit intervals; and detecting an error of the phase difference which appears in a unit of time shorter than a clock signal based on the detected reference pattern.

3. A laser power control apparatus, comprising: phase error detection means for detecting, based on a reference pattern including a record mark which appears repetitively at predetermined bit number intervals, an error appearing in a phase difference between a magnetic domain wall displacement which occurs with a leading end of an isothermal region formed on a recording medium by irradiation of a playback laser beam and another magnetic domain wall displacement which occurs with a trailing end of the isothermal region; amplitude detection means for detecting an amplitude of the predetermined bit number period of the reference pattern based on a clock signal; and control means for controlling a playback laser power based on a result of the detection from said phase error detection means and a result of the detection from said amplitude detection means.

4. A laser power control apparatus according to claim 3, wherein said control means discriminates an error of the phase difference which occurs in a unit of the clock signal based on the amount of jitters of the clock signal.

5. A laser power control apparatus according to claim 4, wherein said control means sets a playback laser power when the amount of jitters exhibits a bottom and a 5T amplitude detected by said amplitude detection means exhibits a peak.

6. A laser power control apparatus according to claim 3, wherein said phase error detection means detects an error of the phase difference which occurs in a unit of time shorter than the clock signal.

7. A laser power control apparatus according to claim 6, wherein said control means discriminates the error of the phase difference which occurs in a unit of the clock signal and discriminates also the error of the phase difference which occurs in a unit of time shorter than the clock signal.

8. A laser power control apparatus according to claim 7, wherein said control means sets the playback laser power when the amount of jitters exhibits a bottom and a 5T amplitude detected by said amplitude detection means exhibits a peak and besides the error of the phase difference exhibits a zero cross.

9. A laser power control method, comprising the steps of: detecting, based on a reference pattern including a record mark which appears repetitively at predetermined bit number intervals, an error appearing in a phase difference between a magnetic domain wall displacement which occurs with a leading end of an isothermal region formed on a recording medium by irradiation of a playback laser beam and another magnetic domain wall displacement which occurs with a trailing end of the isothermal region; detecting an amplitude of the predetermined bit number period of the reference pattern based on a clock signal; and setting a playback laser power based on a result of the detection by the phase error detection step and a result of the detection by the amplitude detection step.

10. A laser power control method according to claim 9, wherein the step of setting the laser power discriminates an error of the phase difference which occurs in a unit of the clock signal based on the amount of jitters of the clock signal.

11. A laser power control method according to claim 10, wherein the step of setting the laser power sets a playback laser power when the amount of jitters exhibits a bottom and a 5 T amplitude detected by the step of detecting the amplitude exhibits a peak.

12. A laser power control method according to claim 11, wherein the step of detecting the phase error detects an error of the phase difference which occurs in a unit of time shorter than the clock signal.

13. A laser power control method according to claim 12, wherein the step of setting the laser power discriminates the error of the phase difference which occurs in a unit of the clock signal and discriminates also the error of the phase difference which occurs in a unit of time shorter than the clock signal.

14. A laser power control method according to claim 13, wherein the step of setting the laser power sets the playback laser power when the amount of jitters exhibits a bottom and a 5 T amplitude detected by the amplitude detection step exhibits a peak and besides the error of the phase difference exhibits a zero cross.

15. A magneto-optical recording and/or playback apparatus, comprising: optical pickup means including a laser light source for emitting a laser beam, said optical pickup means being operable to irradiate the laser beam emitted from said laser light source upon a playback layer laminated on a record layer of a magneto-optical recording medium to read an information signal recorded on the record layer of the magneto-optical recording medium by magnetic domain expansions which appear in an isothermal region of the magneto-optical recording medium which appears in response to the laser beam and output a corresponding received light amount signal; playback signal generation means for generating a sum component of the magneto-optical signal and a difference component of the magneto-optical signal based on the received light amount signal outputted from said optical pickup means; and laser power control means for controlling a playback laser power to be supplied to said laser light source based on the sum component and the difference component of the magneto-optical signal supplied thereto from said playback signal generation means.

16. A magneto-optical recording and/or playback apparatus according to claim 5, wherein said laser power control means includes phase error detection means for detecting, based on a reference pattern including a record mark which appears repetitively at predetermined bit number intervals, an error appearing in a phase difference between a magnetic domain wall displacement which occurs with a leading end of the isothermal region formed on the recording medium by irradiation of the playback laser beam and another magnetic domain wall displacement which occurs with a trailing end of the isothermal region, amplitude detection means for detecting an amplitude of the predetermined number period of the reference pattern based on a clock signal, and control means for controlling a playback laser power based on a result of the detection from said phase error detection means and a result of the detection from said amplitude detection means.

* * * * *